UNITED STATES PATENT OFFICE.

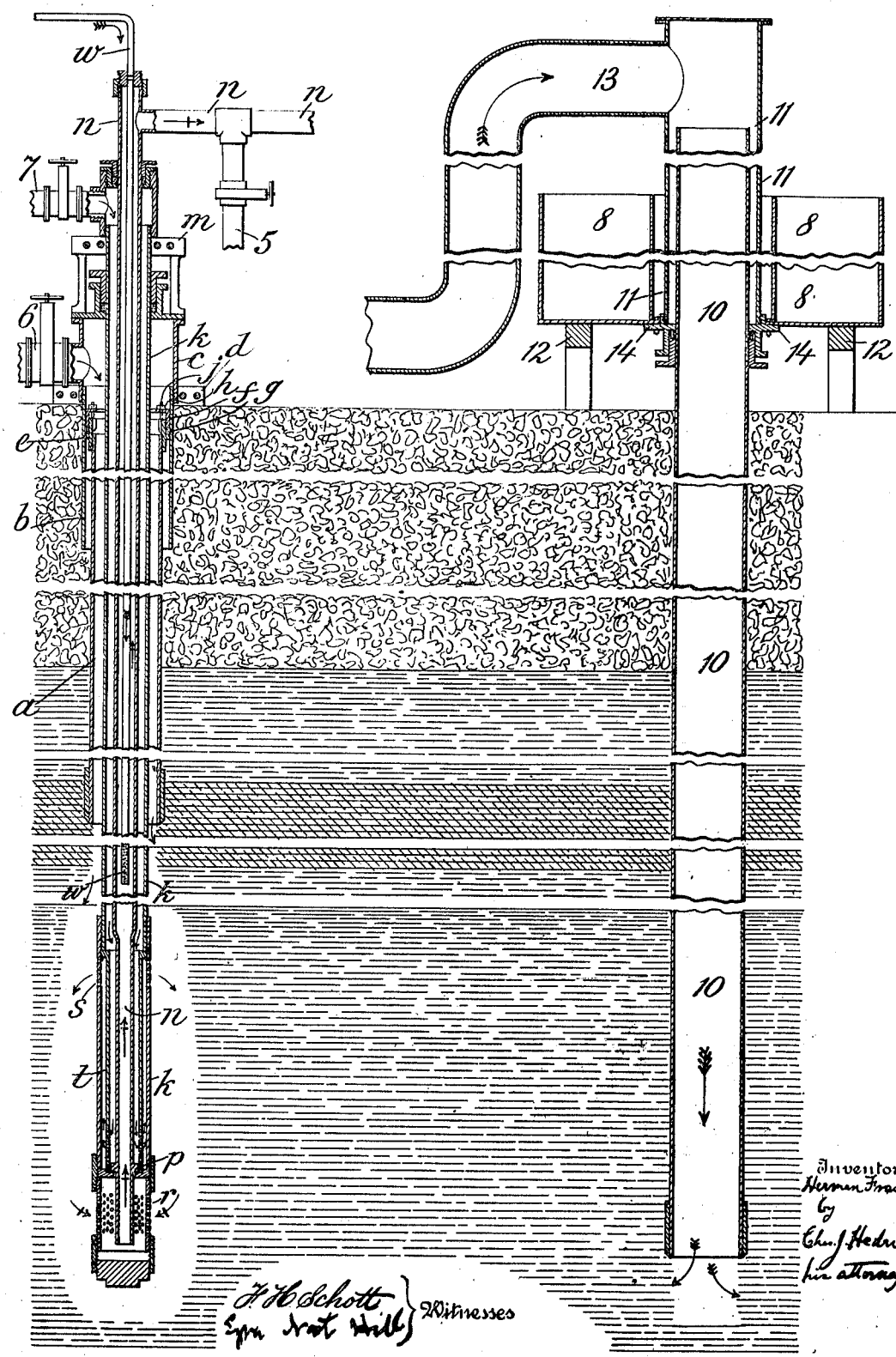

HERMAN FRASCH, OF NEW YORK, N. Y., ASSIGNOR TO THE FRASCH SULPHUR PROCESS COMPANY, A CORPORATION OF MAINE.

MINING SULFUR.

988,995.  Specification of Letters Patent.  Patented Apr. 11, 1911.

Application filed October 30, 1903. Serial No. 179,234.

*To all whom it may concern:*

Be it known that I, HERMAN FRASCH, a citizen of the United States, residing at New York city, borough of Manhattan, and county of New York, in the State of New York, have invented new and useful Improvements in Mining Sulfur, of which the following is a specification.

This invention relates more particularly to the obtainment of sulfur from underground deposits by melting sulfur therein and removing it therefrom in the melted state; but each of the improvements constituting the invention is intended to be secured for all the uses to which it, with or without modification, may be adapted. On October 20, 1891, I obtained patents (461,429 and 461,430) on this form of mining. As the best means then known to me for melting the sulfur in the deposit, I described the circulation through the deposit of a fusing fluid (hot water under pressure), such fluid being introduced into the deposit and afterward returned to the surface of the ground. Subsequently I discovered that it was much more practical, in the case of a water flooded porous deposit, to introduce the fusing fluid (hot water) without return, the fluid being caused to flow away underground.

In working with or without return of fusing fluid the fluid was introduced into the deposit at a temperature at which sulfur is liquid. The temperature of 280° F. is mentioned in said patents by way of example (the claim not being limited thereto); afterward I discovered that it was very advantageous to have a temperature above 300° F., at least in working without return. The advantage of this high temperature arose from the naturally present water; which, indeed, caused much unexpected difficulty. The present invention seeks, for one object, to utilize this naturally present water as part of the fusing liquid, by raising its temperature to above the melting point of sulfur. To accomplish this a heating fluid (liquid or aeriform) is introduced into the deposit at a temperature, not only above the melting point of sulfur, but above its limit of liquefaction, or, in other words, so far above the said melting point as that melted sulfur is or begins to be pasty thereat; and when this abnormally heated fluid (so to speak) mingles with the naturally present water, the resultant mixture is brought to a temperature at which sulfur is liquid. Live steam is considered the most advantageous fluid, for one reason, on account of the large quantity of heat which can be carried thereby through a pipe of given size, owing to its aeriform condition, to the large amount of heat stored therein as latent heat of vaporization and to its condensation in the deposit. Moreover, the formation of live steam seems to be the most convenient and economical way of taking up heat from fires. Other fusing fluids can be used instead of live steam, as, for example, water heated, by condensation of live steam therein or by other means, above the limit of liquefaction of sulfur, as aforesaid.

In using live steam it is not essential that it should enter the deposit in the aeriform state; for it may suffer condensation on its way thereinto, with or without assistance from water introduced into the same piping or into piping of the same well; but it is believed to be better to have the steam itself enter the deposit and be condensed therein after escaping from the inlet pipe.

In carrying out the preceding general process, it is considered best to introduce the fluid heated to above the liquefaction limit of sulfur through one well and to raise the melted sulfur through another; for one reason, because in this way the operations of melting and raising may take place concurrently. And it is also considered advantageous to introduce into the underground deposit at the sulfur-raising well, water heated above the melting point of sulfur and not above its limit of liquefaction. Moreover, so far as I am aware, it is new in general to introduce a fusing fluid into a deposit at one well in order to melt sulfur to be raised at another; and this process is included in the invention when said fusing fluid is introduced into the deposit at or below the limit of liquefaction of sulfur, as well as when its temperature is above said limit.

The following is a description of what is considered the best mode of carrying the invention into effect, with steam as the fusing fluid of a temperature above the liquefaction limit of sulfur, and with the aid of a raising well which is utilized also for the introduction of hot water at or below said liquefaction limit; but it will be understood that other fusing fluids can be used and that modifications in other respects also can be made so long as the substance is taken of any one or more of the hereinafter written claims.

The accompanying drawing, which forms part of this specification, is a diagram of what is considered the best form of apparatus for carrying the invention into effect, but any suitable apparatus can be used.

In the raising well shown, the mine piping for conveying the hot water to the deposit consists of an outer pipe in telescoping sections and an inner pipe. The lower section $a$ of the outer hot water pipe rests upon the rock in or below which the sulfur deposit is. The upper section $b$ of the same is provided with a casing head $c$ and telescopes with the lower section. It is supported by a clamp $d$, which rests directly or indirectly on the top of the ground. It may be about 40 feet long.

Between the two sections is a packing to prevent the passage of water. It is best made after the manner of a stuffing box, with a part $e$ in the form of a ring screwed on the top of the lower section and a follower $f$ in the form of a ring adjustably held against the packing $g$ by means of nuts $h$ on the ends of bolts $j$ whose lower ends are anchored in the body of the part $e$.

The inner hot water pipe $k$ is suspended from the clamp $m$, which is upheld by feet resting on the casing head.

The sulfur pipe $n$ has a collar $p$ near the bottom which rests upon the pipe closure or plug $q$ in the interior of the water pipe $k$, the lower end of the sulfur pipe projecting into the strainer $r$ at the bottom of the water pipe $k$. The plug $q$ normally separates the strainer from the bore of the water pipe, but, when the sulfur pipe is lifted out, the water from the pipe $k$ can enter the strainer and clear its perforations.

Instead of allowing the hot water to escape immediately above the strainer $r$, the discharge (composed of openings $s$) is placed higher up, in order to diminish the liability of the water getting into the sulfur pipe. In order, however, to insure the liquid condition of the sulfur below said discharge $s$, the bore of the water pipe $k$ is extended below said discharge $s$ and is returned upon itself. This return bend or passage is best made by a partition $t$ in the water pipe $k$, which partition is annular as shown and has a flange at the top and perforations at the bottom. The water passes down between the sulfur pipe $n$ (which is here preferably reduced in diameter as shown) and the annular partition $t$, out through the perforations in the partition, up between the annular partition $t$ and the wall of water pipe $k$ and out through the openings $s$ into the mine cavity.

The pipe $w$ delivers compressed air into the melted sulfur, so that the average density of the column is lessened sufficiently for the pressure in the mine to force the melted sulfur to the surface of the ground.

At 5 is shown a valved hot water pipe, so that, when desired, the pipe $n$ beyond the branch being closed and the delivery of compressed air being stopped, hot water can be forced down the sulfur pipe, in order to clean the strainer (without lifting the sulfur pipe) or to increase the water for melting. The sulfur which is then melted collects in the bottom of the mine cavity, and is subsequently removed.

At 6 is the hot water pipe connected with the casing head $c$. The water from it passes through the lower section $a$ of the outer hot water pipe into the upper part of the mine cavity.

At 7 is the branch through which hot water is supplied to the inner hot water pipe $k$, whose discharge $s$ is near the bottom of the mine cavity.

The hot water descends through the pipes $a$ and $k$, and flows out into the deposit until it is lost in underground recesses; while the sulfur melted thereby collects about the open bottom of pipe $n$ (which it seals against ingress of water) and is raised to the surface of the ground by the pressure in the deposit, the average density of the sulfur column being suitably lightened by the air which is injected into and mingles with the melted sulfur.

There is nothing in the construction and operation of the raising well, as so far described in connection with the drawing, which has not already been patented or made the subject of applications for patents. See my patents of October 20, 1891, Nos. 461,429 and 461,430, already mentioned; my application of May 27, 1897, No. 638,357, with the divisions thereof, and my applications of even date herewith, Nos. 179,232 and 179,233. The divisions of my said application of May 27, 1897, consist of an application of November 23, 1903, No. 182,359, and two applications of February 6, 1905, Nos. 244,508 and 244,510, No. 244,508 being in part only for divisional subject-matter, that is to say for matter found in my said application of May 27, 1897, and being consequently in part only in continuation thereof. On September 19, 1905, patents respectively numbered 799,642 and 800,127 were granted on my said application of May 27, 1897, and its said division of November 23, 1903. On July 13, 1909, patent numbered 928,036 was granted on my said application 244,508. On November 12, 1907, patent numbered 870,620 was granted on my said application 179,232; and on December 6, 1910, patent numbered 977,444 was granted on my said application 179,233. A raising well, with or without means for introducing a fusing fluid through the same, of any suitable description could be used for carrying out the present invention. See, for example, my said patents and prior applications.

At such distance from the raising well as not to heat the sulfur to be raised above its limit of liquefaction, say, at a distance of about twenty feet, more or less, a melting well is shown. As shown, it consists of a mine pipe in telescoping sections, the lower section 10 resting on the rock (through which a hole may be drilled in continuation of the pipe's bore) and the upper section 11 being held by a support 12 which rests directly or indirectly on the surface of the ground. The lower section passes through a stuffing box on the lower end of the upper section; and the upper section is shown weighted with an annular tank 8, which resists the tendency of the pressure inside of said upper section to lift the same. It may be filled with water or other weight-giving material. As shown, it rests on the support 12 and is bolted to a flange 14 of a coupling which receives the lower end of pipe section 11 and which carries the stationary part of the stuffing box. A pipe 13 delivers live steam to the pipe section 11; and as the upper end of the lower section 10 is open the steam passes down the same to the deposit.

The steam should have sufficient pressure to force itself into the deposit against the pressure of the water naturally present therein. In the deposit which I have encountered, lying as it does between six hundred and seven hundred feet below the surface of the ground, the pressure of the naturally present water is about three hundred pounds to the square inch above atmospheric pressure. The steam should have a pressure enough higher than this to produce the desired flow, so that it would be much above the limit of liquefaction of sulfur. At three hundred pounds' pressure, steam would have a temperature of about 422° F., at which temperature, as is known, sulfur is so pasty that it does not flow.

The steam condenses in the deposit, heating the naturally present water and mixing therewith to form a body of hot water above the melting point of sulfur and below its limit of liquefaction. This water melts the sulfur with which it comes in contact; and the melted sulfur (in whole or in part, as the case may be) collects in the pool which forms about the lower end of the pipe $n$, up which it is raised by the pressure in the deposit, aided by the lightening of the average density of the sulfur column in said pipe by the air from the pipe $w$.

It is probable that the naturally present water would at first be heated to above the limit of liquefaction of sulfur; but, if so, its temperature would be reduced in traveling away from the pipe 10. After its temperature has fallen below the melting point of sulfur, it aids in warming the rock at or beyond the borders of the melting space.

Should it be desired to induce a greater flow from the melting well (that is, the well constituted by the pipe 10) to the raising well (of which a sulfur-raising pipe, to wit, the pipe $n$, as shown, is the essential feature), water may be allowed to rise through said well, say, through either or both the pipes $a$ $b$ and $k$, the same being held under pressure to prevent vaporization thereof.

The pressure of the steam introduced through the pipe 10 of the melting well would naturally vary with the pressure of the water naturally present in the deposit. Possibly a deposit exists in which the pressure in the deposit would be so low that the temperature of steam of corresponding pressure would be between the melting point and liquefaction limit of sulfur. In such case, should it be desired to use a fusing fluid above the liquefaction limit of sulfur, the steam might be superheated; and so it might when the temperature corresponding with its pressure is above said limit.

The pipe 10 could be used to introduce any suitable fusing fluid, of any desired temperature, above the melting point of sulfur.

As many melting wells as desired can be used to one raising well; or conversely there may be as many raising wells as desired to one melting well. The same well might serve alternately for melting by the aid of a fusing fluid heated above the liquefaction limit of sulfur and for raising the so melted sulfur. Such a well might be of the simplest description.

When sulfur is heated it first melts, and on further heating becomes pasty; the temperature at which it first melts is herein referred to as its melting point; the temperature at which on further heating it begins to be pasty is herein referred to as its liquefaction limit or limit of liquefaction.

In order to mine a material, this latter must be brought to the surface of the ground; hence the expression "mining by fusion" in the hereinafter written claims includes the removal of the mined material as well as the fusion of the same underground.

I claim as my invention or discovery:

1. In mining sulfur by fusion, the improvement consisting in introducing into an underground sulfur deposit fusing fluid of a temperature above the degree at which melted sulfur begins to be pasty when further heated, and raising in a melted state the sulfur which becomes melted by the aid of heat conveyed into the deposit by said fluid, substantially as described.

2. In mining sulfur by fusion, the improvement consisting in introducing into an underground sulfur deposit in porous rock naturally flooded with water fusing fluid of a temperature above the degree at which melted sulfur begins to be pasty when further heated, and raising in a melted state the sulfur which becomes melted by the aid of heat conveyed into the deposit by said fluid, substantially as described.

3. In mining sulfur by fusion, the improvement consisting in introducing into an underground sulfur deposit through the piping of one well fusing fluid of a temperature above the degree at which melted sulfur begins to be pasty when further heated, and raising in a melted state through piping of another well the sulfur which becomes melted by the aid of heat conveyed into the deposit by said fluid, substantially as described.

4. In mining by fusion, the improvement consisting in introducing fusing fluid into an underground deposit through piping of one well, and raising in a melted state through piping of another well material which becomes melted by the aid of heat conveyed into the deposit by said fluid, substantially as described.

5. In mining sulfur by fusion, the improvement consisting in introducing into an underground deposit through different wells fusing fluids of different temperatures, namely, through one well fusing fluid of a temperature above the degree at which melted sulfur begins to be pasty when further heated and through another well fusing fluid of a temperature below the last mentioned degree but above the melting point of sulfur, and raising in a melted state through the last mentioned well the sulfur which becomes melted by the aid of heat conveyed into the deposit by said fluids, substantially as described.

6. In mining by fusion, the improvement consisting in introducing fusing fluid through piping of different wells, and raising in a melted state through piping of less than the whole number of said wells the material which becomes melted by the aid of heat conveyed into the deposit by the fusing fluid from all said wells, including such as shall serve for raising the melted material, substantially as described.

7. In mining sulfur by fusion, the improvement consisting in introducing into an underground sulfur deposit steam of a temperature above the degree at which melted sulfur begins to be pasty when further heated, and raising the melted sulfur, substantially as described.

8. In mining sulfur by fusion, the improvement consisting in introducing into an underground sulfur deposit in porous rock naturally flooded with water steam of a temperature above the degree at which melted sulfur begins to be pasty when further heated, and raising the melted sulfur, substantially as described.

9. In mining sulfur by fusion, the improvement consisting in supplying to mine piping steam of a temperature above the degree at which melted sulfur begins to be pasty when further heated, thereby introducing fusing fluid of a temperature above such last mentioned degree into the underground sulfur deposit to which said piping leads, and raising the melted sulfur, substantially as described.

10. In mining sulfur by fusion, the improvement consisting in supplying to mine piping which leads to an underground sulfur deposit in porous rock naturally flooded with water steam of a temperature above the degree at which melted sulfur begins to be pasty when further heated, thereby introducing fusing fluid of a temperature above such last mentioned degree into the underground sulfur deposit to which said piping leads, and raising the melted sulfur, substantially as described.

11. In mining sulfur by fusion, the improvement consisting in introducing into an underground sulfur deposit containing water of a temperature below the degree at which melted sulfur begins to be pasty when further heated fusing fluid of a temperature above such last mentioned degree, and raising the melted sulfur, substantially as described.

12. In mining sulfur by fusion, the improvement consisting in introducing into an underground sulfur deposit containing water of a temperature below the degree at which melted sulfur begins to be pasty when further heated steam of a temperature above such last mentioned degree, and raising the melted sulfur, substantially as described.

13. In mining sulfur by fusion, the improvement consisting in introducing through one well into a water flooded and porous underground deposit of sulfur steam of a temperature above the degree at which melted sulfur begins to be pasty when further heated, and raising the melted sulfur through another well, substantially as described.

14. In mining sulfur by fusion, the improvement consisting in introducing through one well into an underground sulfur deposit steam of a temperature above the degree at which melted sulfur begins to be pasty when further heated, introducing water of a temperature below such last mentioned degree and above the melting point of sulfur through another well in suitable proximity to receive sulfur melted by heat which said steam supplies, and raising the melted sulfur through this latter well, substantially as described.

15. In mining by fusion, the improvement consisting in introducing steam into a deposit of the fusible material being mined containing water of lower temperature under a pressure greater than the vapor tension of water of the temperature at which said material is melted in said deposit, so that the steam becomes condensed in said deposit, substantially as described.

16. In mining by fusion, the improvement consisting in introducing steam into a deposit of the fusible material being mined containing water of lower temperature under a pressure greater than the vapor tension of water of the temperature at which said material is melted in said deposit, so that the steam becomes condensed in said deposit, and raising the melted material, substantially as described.

17. In mining by fusion, the improvement consisting in introducing steam at one well into a deposit containing water at lower temperature, and raising the melted material through another well, substantially as described.

18. In mining by fusion, the improvement consisting in introducing steam at one well into a deposit, introducing hot water through another well into said deposit, and raising the melted material through the latter well, substantially as described.

19. In mining sulfur by fusion, the improvement consisting in introducing steam into an underground deposit at a temperature above the degree at which melted sulfur begins to be pasty when further heated and under a pressure greater than the vapor tension of water of the temperature at which the sulfur is melted in said deposit, so that the steam becomes condensed in said deposit as well as reduced in temperature therein below the degree at which melted sulfur begins to be pasty as aforesaid, substantially as described.

20. In mining by fusion, the improvement consisting in introducing steam into an underground deposit at a temperature above the melting point of the material being mined and under a pressure greater than the vapor tension of water of the temperature at which the material is melted in said deposit, so that the steam becomes condensed in said deposit, substantially as described.

21. In mining by fusion in porous deposits, the improvement consisting in introducing steam into an underground deposit at a temperature above the melting point of the material being mined and under a pressure greater than the vapor tension of water of the temperature at which the material is melted in said deposit, so that the steam becomes condensed in said deposit, and confining the greater part of the water of condensation to the deposit, so that it is forced to flow away underground, substantially as described.

22. In mining sulfur in porous deposits by fusion, the improvement consisting in introducing into such deposit a fusing fluid of a temperature above the degree at which melted sulfur begins to be pasty when further heated, and causing the greater part of said fluid to flow away in liquid state underground, substantially as described.

23. In mining by fusion, the improvement consisting in introducing into an underground deposit through the piping of one well a fusing fluid which has in the deposit the form of hot water, and raising in a melted state through piping of another well material which becomes melted by the aid of heat conveyed into the deposit by said fluid, substantially as described.

24. In mining by fusion, the improvement consisting in introducing fusing fluid into an underground porous deposit through piping of one well, causing the fluid in greater part to flow away underground, and raising the melted material through piping of another well, substantially as described.

25. In mining by fusion, the improvement consisting in introducing fusing fluid through piping of different wells, causing such fusing fluid in greater part to flow away underground, and raising through the piping of less than the whole number of wells the material melted by the coöperation of the fusing fluid from all the wells, including such as shall serve for raising the melted material, substantially as described.

In testimony whereof I have signed my name to this specification in the presence of two subscribing witnesses.

HERMAN FRASCH.

Witnesses:
F. W. LOTHMAN,
J. C. UPDEGROVE.